(12) United States Patent
Smolyanskaya et al.

(10) Patent No.: US 11,797,173 B2
(45) Date of Patent: Oct. 24, 2023

(54) SYSTEM AND METHOD OF PROVIDING DIGITAL INK OPTIMIZED USER INTERFACE ELEMENTS

(71) Applicant: MICROSOFT TECHNOLOGY LICENSING, LLC, Redmond, WA (US)

(72) Inventors: Irina Smolyanskaya, Seattle, WA (US); Julio Estrada, Santa Ynez, CA (US); Yoon Jin Lee, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 15 days.

(21) Appl. No.: 17/134,853

(22) Filed: Dec. 28, 2020

(65) Prior Publication Data
US 2022/0206679 A1    Jun. 30, 2022

(51) Int. Cl.
*G06F 3/04883* (2022.01)
*G06F 3/041* (2006.01)
*G06F 40/166* (2020.01)

(52) U.S. Cl.
CPC ........ *G06F 3/04883* (2013.01); *G06F 3/0416* (2013.01); *G06F 40/166* (2020.01)

(58) Field of Classification Search
CPC ... G06F 3/04883; G06F 3/0416; G06F 40/166
See application file for complete search history.

(56) References Cited

U.S. PATENT DOCUMENTS

| | | | |
|---|---|---|---|
| 5,596,699 A * | 1/1997 | Driskell | G06F 3/0482 715/834 |
| 5,828,360 A | 10/1998 | Anderson et al. | |
| 7,058,902 B2 | 6/2006 | Iwema et al. | |
| 7,159,181 B2 | 1/2007 | Mansell et al. | |
| 7,559,037 B2 * | 7/2009 | Keely, Jr. | G06F 3/0483 345/181 |
| 8,549,432 B2 * | 10/2013 | Warner | G06F 3/04817 715/834 |
| 9,201,520 B2 | 12/2015 | Benko et al. | |

(Continued)

FOREIGN PATENT DOCUMENTS

EP   2662756 A1   11/2013

OTHER PUBLICATIONS

"Radial Menus", published on Apr. 11, 2018 at https://partner.steamgames.com/doc/features/steam_controller/radial_menus, retrieved Feb. 25, 2022 (Year: 2018).*

(Continued)

*Primary Examiner* — Shourjo Dasgupta
(74) *Attorney, Agent, or Firm* — NovoTechIP International PLLC

(57) ABSTRACT

A method of and system for providing a user interface (UI) element is carried out by receiving an input for invoking the UI element in a UI screen, the input being received via a writing instrument, determining a direction of tilt of the writing instrument at a point of input, and upon determining the direction of tilt of the writing instrument, displaying the UI element in a location on the UI screen that is a direction opposite to the determined direction of tilt of the writing instrument. The UI element may provide access to each of the UI controls via a plurality of unstructured paths.

14 Claims, 10 Drawing Sheets

(56) References Cited

U.S. PATENT DOCUMENTS

| | | |
|---|---|---|
| 9,569,045 B2 | 2/2017 | Westerman |
| 9,746,995 B2 | 8/2017 | Kotler et al. |
| 9,778,821 B2 * | 10/2017 | Blackman .............. G06F 3/0482 |
| 9,946,365 B2 | 4/2018 | Cueto |
| 9,965,060 B1 * | 5/2018 | Yeh ........................ G06F 3/0446 |
| 2002/0122072 A1 * | 9/2002 | Selker .................... G06F 3/0482 |
| | | 715/834 |
| 2004/0221243 A1 * | 11/2004 | Twerdahl ............... G06F 3/0482 |
| | | 715/810 |
| 2004/0246240 A1 * | 12/2004 | Kolmykov-Zotov ........................ |
| | | G06F 3/04883 |
| | | 345/179 |
| 2006/0012580 A1 * | 1/2006 | Perski ...................... G06F 3/046 |
| | | 345/173 |
| 2009/0327955 A1 * | 12/2009 | Mouilleseaux ..... G06F 3/04812 |
| | | 715/810 |
| 2009/0327963 A1 * | 12/2009 | Mouilleseaux ..... G06F 3/04883 |
| | | 715/834 |
| 2009/0327964 A1 * | 12/2009 | Mouilleseaux ..... G06F 3/04883 |
| | | 715/834 |
| 2010/0182247 A1 * | 7/2010 | Petschnigg ......... G06F 3/041661 |
| | | 345/173 |
| 2011/0055760 A1 * | 3/2011 | Drayton ................ G06F 3/0482 |
| | | 715/834 |
| 2011/0093815 A1 * | 4/2011 | Gobeil .................... G06F 9/451 |
| | | 715/825 |
| 2012/0105362 A1 * | 5/2012 | Kremin ................... G06F 3/046 |
| | | 345/174 |
| 2014/0022218 A1 | 1/2014 | Parekh et al. |
| 2014/0210797 A1 | 7/2014 | Kreek |
| 2016/0077734 A1 * | 3/2016 | Buxton ............... G06F 3/04842 |
| | | 715/773 |
| 2016/0154474 A1 * | 6/2016 | Park .................... G06F 3/03545 |
| | | 345/173 |
| 2017/0262122 A1 * | 9/2017 | Chang ................... G06F 3/0441 |
| 2018/0181245 A1 | 6/2018 | Beck et al. |
| 2018/0183954 A1 * | 6/2018 | Endo .................. H04N 1/00411 |
| 2019/0033993 A1 * | 1/2019 | Robinson ........... G06F 3/03545 |
| 2019/0196673 A1 * | 6/2019 | Bashev ................. G06F 3/0481 |
| 2019/0235647 A1 * | 8/2019 | Chang .................... G06F 3/044 |
| 2019/0245992 A1 * | 8/2019 | Horiike .............. H04N 1/00506 |
| 2021/0042638 A1 * | 2/2021 | Novotny ............... H04L 67/535 |
| 2021/0200393 A1 * | 7/2021 | Wohlstadter ........ G06F 3/04886 |

OTHER PUBLICATIONS

"Example: Using a Custom Path", Retrieved from: https://web.archive.org/web/20151001054743/https://www.drupal.org/node/2488874, Oct. 1, 2015, 8 Pages.

"International Search Report and Written Opinion Issued in PCT Application No. PCT/US21/061502", dated Mar. 30, 2022, 10 Pages.

* cited by examiner

SYSTEM AND METHOD OF PROVIDING DIGITAL INK OPTIMIZED USER INTERFACE ELEMENTS

TECHNICAL FIELD

This disclosure relates generally to providing an improved user interface for use with digital ink input and, more particularly, to an improved method of and system for providing user interface elements that are optimized for use with digital ink input.

BACKGROUND

Many recently developed computer devices have the ability to receive digital ink as a form of input. As a result, numerous users have begun utilizing digital ink input as a manner of interacting with a computer device. The digital ink input may take the form of handwritten strokes, which the device may display as ink as the strokes are entered. To receive the handwritten strokes, the device may provide a writing surface, which could be the same as the display screen. This enables the user to view the digital ink as the user is writing and/or drawing on the surface. A handwritten stroke may begin when a writing instrument lands on the writing surface and may end when the writing instrument is lifted off the writing surface. The writing instrument may be an electronic or non-electronic pen, a stylus, the user's own finger, or any another object used to write on the writing surface.

In addition to offering digital ink as a form of input, most digital ink enabled applications provide a variety of features (e.g., tasks or options) the user may choose from. For example, digital ink enabled applications may provide user interface (UI) elements for selecting an ink color. However, these UI elements are often presented in formats that are optimized for traditional forms of input (e.g., keyboard, mouse or touch). However, digital ink input is very different from traditional forms of input. For example, digital ink input is more precise, requires a different kind of hand movement and is closer to the act of writing with a pen and paper. Furthermore, digital ink input is received differently than traditional forms of input. As a result, the traditional UI elements provided are often difficult to interact with while digital ink input is being utilized.

Hence, there is a need for improved systems and methods for providing UI elements that are optimized for use with digital ink input.

SUMMARY

In one general aspect, the instant disclosure describes a device having a processor, and a memory in communication with the processor where the memory comprises executable instructions that, when executed by the processor, cause the device to perform multiple functions. The function may include receiving an input for invoking a user interface UI element in a UI screen, the input being received via a writing instrument, determining a direction of tilt of the writing instrument at a point of input, and upon determining the direction of tilt of the writing instrument, displaying the UI element in a location on the UI screen that is in a direction opposite to the determined direction of tilt of the writing instrument to minimize obstruction of the UI element by a user's hand.

In yet another general aspect, the instant application describes a method for providing a user interface UI element, where the method includes the steps of receiving an input for invoking the UI element in a UI screen, the input being received via a writing instrument, determining a direction of tilt of the writing instrument at a point of input, and upon determining the direction of tilt of the writing instrument, displaying the UI element in a location on the UI screen that is in a direction opposite to the determined direction of tilt of the writing instrument to minimize obstruction of the UI element by a user's hand.

In a further general aspect, the instant application describes a non-transitory computer readable medium on which are stored instructions that when executed cause a programmable device to receive an input for invoking a user interface UI element in a UI screen, the input being received via a writing instrument, determine a direction of tilt of the writing instrument at a point of input, and upon determining the direction of tilt of the writing instrument, display the UI element in a location on the UI screen that is in a direction opposite to the determined direction of tilt of the writing instrument to minimize obstruction of the UI element by a user's hand.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
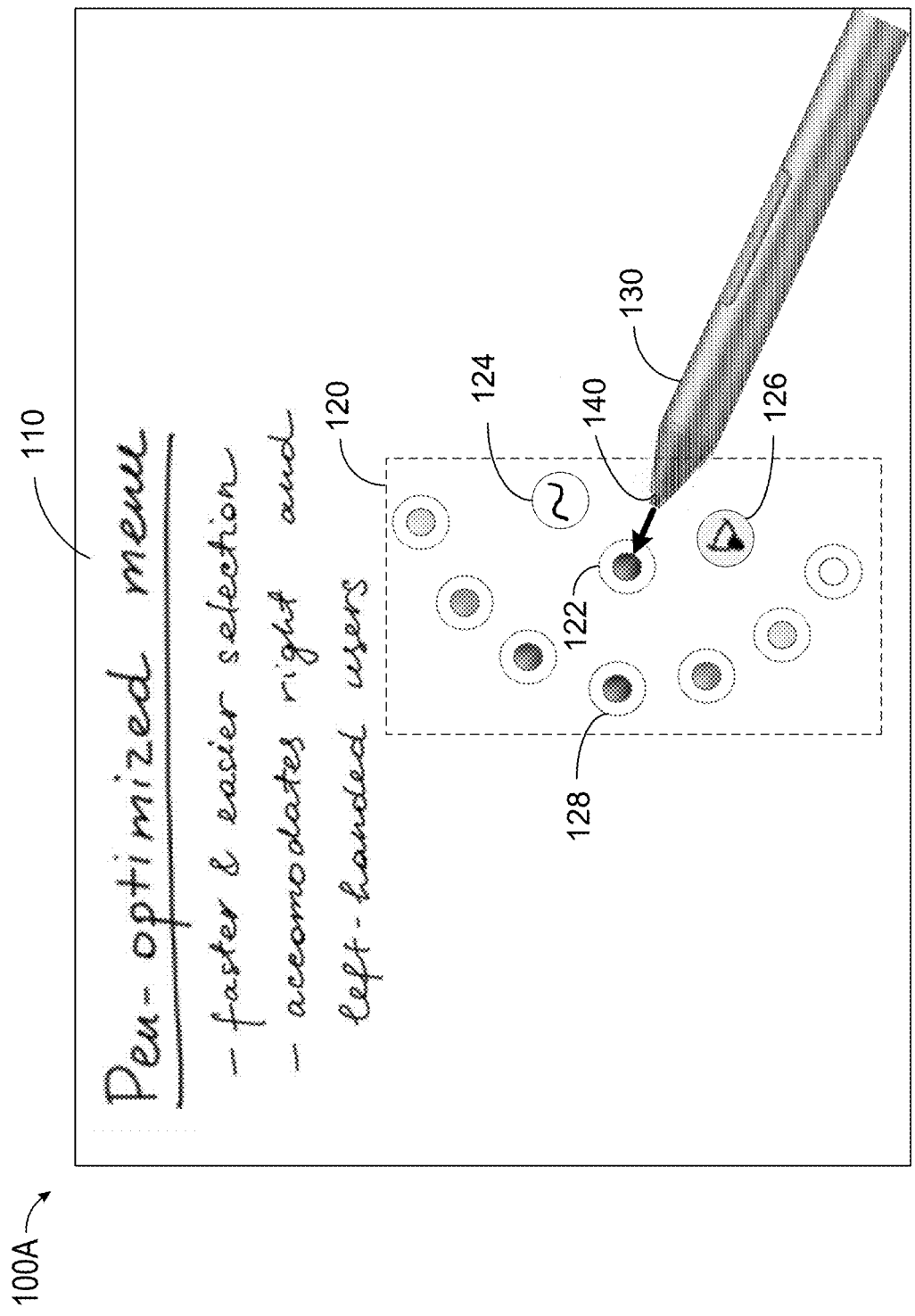
FIGS. 1A-1D depict example UI screens for displaying digital ink optimized UI elements.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Digital ink has become popular in recent years as a form of input for many computer users. For example, users may utilize digital ink input in a similar manner as that of pen and paper to take notes during a meeting, draw a diagram, write a formula or perform various other tasks. Applications that offer digital ink input as an option often provide various features (e.g., menu options) for users to utilize. Some of these features may relate to the digital ink input, while others may be general features offered by the application. For example, some applications may provide a feature for changing the ink color, while also offering features for editing entered input. These features are typically provided in UI elements displayed on the screen. For example, toolbars, contextual menus, pop-menus and others are used to display various application features to the user.

The UI elements displayed on the screen, however, are geared towards traditional forms of input. For example, most toolbar menus are displayed on the top or bottom of the screen. While these locations may function well for users that utilize a pointing device such as a mouse, they may be difficult for digital ink users to access. That is because a digital ink user may need to lift their input device (e.g., digital pen) from its current location on the screen and move it to a different location to access a desired UI element. This may disrupt the user's flow of work and decrease their efficiency. Thus, there exits the technical problem of displaying UI elements in a manner that digital ink users can access with efficiency and without disrupting their workflow.

Furthermore, contextual menus are often displayed in proximity to the location where user input is received. For example, to display a contextual menu in a word processing document, the user may right-click on a location on the screen, and in response, a contextual menu may be displayed adjacent to the location of the right-click. While this is helpful to users that utilize traditional forms of input, it may lead to challenges for users of digital ink input. That is because, when utilizing a writing instrument to enter digital ink input on the screen, the user's hand often covers the portion of the screen adjacent to the location of the writing instrument. When the UI element is displayed in proximity to the input location, it is likely that at least a portion of the UI element will be covered by the user's hand, and as such be difficult to view and access. Furthermore, the UI element may obscure existing inking input of interest. Thus, there exits another technical problem of displaying UI elements in a manner that they not obscure existing content and are not obscured by the user's hand.

Still further, UI elements in use with digital ink input typically require a specific structured path from one point to another to navigate to various items on a menu. For example, the user needs to navigate to an icon for selecting ink color and then follow a specific path from that icon to an icon for their desired color to select that color. That often requires practice and proficiency, and leads to user frustration. Thus, there exits another technical problem of providing UI elements that enable easy navigation for digital ink users.

To address these issues and more, in an example, this description provides an improved user interface and method of providing digital ink optimized UI elements. To achieve this, a mechanism may be used to determine the location of the user's hand, identify the location of existing content, and based on the determined locations display the UI element in a position that is away from the user's hand and/or the existing content. The location of the user's hand may be identified by determining the direction of tilt of the writing instrument. For example, if the writing instrument is determined to be tilting to the right, the user's hand may be identified as being located to the right of the writing instrument. As a result, the UI element may be displayed on a position to the left of the writing instrument to ensure an unobstructed view. Furthermore, providing digital ink optimized UI elements may include offering menus that enable unstructured navigation to various items on the menu.

As will be understood by persons of skill in the art upon reading this disclosure, benefits and advantages provided by such implementations can include, but are not limited to, a solution to the technical problems of having inefficient, error-prone, time-consuming and difficult to use and view UI elements for digital ink users. Technical solutions and implementations provided herein optimize and improve the display and use of UI elements for digital ink input by taking into account the location of the user's hand and/or location of existing content and displaying the UI elements in a location that increases the likelihood of providing an unobstructed view of the UI element and/or clear view of existing content. Furthermore, the technical solutions and implementations provided herein optimize use of UI elements with digital ink input by providing UI elements that enable unstructured paths for navigating to various items on the UI element. The benefits provided by these technology-based solutions include providing increased efficiency and usability of digital ink as a form of input for a computing device.

As used herein, the term "writing instrument" may refer to any device used to provide digital ink input. This may include an electronic or non-electronic pen, a stylus, or the user's own finger. Furthermore, as used herein, the term "feature" may be used to refer to task or options provided by various applications for performing various tasks. The term "location of input" may refer to the location on the screen at which an input invoking an ink enabled UI element is received.

FIG. 1A depicts an example UI screen 100A displaying an inking canvas for receiving digital ink input. The inking canvas may be a display screen of an application that provides an option for receiving digital ink as a form of input. For example, screen 100A may be a display screen of a word processing application (e.g., Microsoft® Word), note taking application (e.g., Microsoft® OneNote), or drawing application (e.g., Microsoft® Visio) that offers digital ink as a form of input. In some implementations, use of digital ink input is initiated by selecting one or more UI elements (e.g., menu options). In other implementations, the user may begin providing digital ink input by simply starting to utilize a writing instrument such as the writing instrument 130. The digital ink input may be in the form of handwritten text, drawings, mathematic formulas or any other writing stroke on the inking canvas via a writing instrument. For example, as shown on the UI screen 100A, the writing instrument may be used to provide handwritten text such as the content 110. The writing surface may be provided on the same device that is displaying the UI screen 100A. For example, the screen may be a touch-enabled screen upon which the user can write using a writing instrument.

Most applications that offer digital ink as a form of input display their menus using traditional UI elements that are more conducive to use of non-ink input (e.g., keyboard, mouse or touch). For example, most applications display menu options using toolbars presented on an edge of the screen, which would require an ink user to lift their writing instrument and move it to a different section of the screen. This is often inconvenient and unnecessary for a digital ink user. Furthermore, while contextual menus displayed adjacent to the point of input are often convenient for users of a pointing device (e.g., mouse), they may be burdensome to digital ink users since the menu may be covered by the user's hand or the menu may cover part of the content. However, current applications do not provide different types of UI elements for digital ink input.

To address these issues, the present disclosure provides an ink-enabled UI element that may be displayed in proximity to the writing instrument, while being presented in a location that is not likely to be obscured by the user's hand or cover content of interest. In some implementations, this is achieved by providing a UI element such as the UI element 120 of screen 100A. The UI element 120 may be a radial menu having a plurality of UI controls. The UI element 120 is displayed in a location that is away from the user's hand such that the UI element 120 is not obscured by the user's hand. This is often achieved by displaying the UI element 120 in a location that is in the opposite direction of the writing instrument's tilt angle. Furthermore, the UI element 120 is displayed such that the various UI controls of the UI element are located in close proximity to, and if possible, around the location of the writing instrument to minimize travel distance of the writing instrument to each UI control. Moreover, the UI element 120 is displayed such that icons representing the various UI controls are sufficiently sized and are big enough to be visually recognizable as distinct options and as such easily reachable with the writing instrument's tip.

In some implementations, if other UI elements exist on the screen, the UI element 120 is displayed such that it is laid out without overlapping the existing UI elements. Furthermore, the display of the UI element 120 may take into account the edges of the UI screen such that the UI element 120 can be laid out within the available screen space.

In some implementations, the UI element 120 is a nested radial menu. As a result, by moving to certain UI controls (parent UI controls) on the UI element 120, additional UI controls (children UI control) relating to the selected UI control are displayed. For example, when the UI element 120 is first invoked, at the point of contact 140, only the UI controls 122, 124 and 126 may be displayed. Once the writing instrument 130 is moved to the UI control 122, however, additional UI controls 128 (only one is labeled) may be displayed.

The UI control 122 may relate to changing the ink color, the UI control 124 may be used for changing the type of stroke for the selected pen (e.g., changing the thickness of the ink input), and the UI control 126 may be provided for changing the type of pen (e.g., pen, pencil, highlighter and the like). At this point the user can select one of the UI controls 122, 124, and 126 by moving the writing instrument from the point of contact 140 to the selected UI control (e.g., dragging the writing instrument on the writing surface from the point of contact 140 to the selected UI control). For example, as depicted, the user may select the UI control 122 by moving the writing instrument 130 from the point of contact 140 to the UI control 122 (shown by the arrow). As discussed above, once the writing instrument 130 moves over the UI control 122, additional UI controls 128 (only one is labeled) for changing the color may be displayed. To select a color, the writing instrument may be moved from the UI control 122 to the UI control 128 displaying the desired color. Once the writing instrument 130 is moved to the desired UI control 128, additional UI controls may be displayed. For example, multiple UI controls for selecting the type of stroke and/or stroke thickness may be displayed. It should be noted that while the UI element 120 displays only UI controls for changing the color, the type of pen and the pen's stroke, additional ink related UI controls may be displayed in other ink optimized UI elements. For example, the UI element 120 may include a UI control for invoking an eraser, and a UI control for converting the ink to text (e.g., converting to math or shapes), and others.

The UI element 120 may be invoked directly from the writing instrument 130 via a specific type of input. For example, the UI element 120 may be invoked by pressing and holding the writing instrument 130 on the screen 100A. Because the UI element 120 is directly invoked from the writing instrument 130, the user is not required to move their writing instrument to a specific location on the writing surface to access specific application features. This increases efficiency and prevents the user from having to move around the screen. Furthermore, because the UI element 120 is displayed only when needed, the application can provide more screen space for content and other features.

Selection of a UI control may be made by moving the writing instrument over the UI control (e.g., upon entering a UI control) or by moving over the UI element and lifting off the writing instrument. In an example, UI controls that nest other elements (e.g., the UI control 122 which contains a number of color UI elements) are selected upon entering the UI control (e.g., as soon as the writing instrument enters the UI control 122, it is s committed and the available color UI control are displayed for selection). This may be advantageous because the nested UI control (children) are displayed immediately upon the writing instrument entering the nesting (parent) UI control. In another example, UI controls that show their effect are also selected upon entering the UI control. For instance, the color and stroke thickness elements show their effect or current selection (e.g., a given color or stroke thickness) immediately upon the writing instrument entering the UI control. For certain UI controls, however, selection is made when the writing instrument is lifted off of a UI control.

In some implementations, upon receiving the input for invoking the UI element, mechanisms may be used to identify the location of point of contact 140, determine a direction of the writing instrument 130, and/or detect the location of the content 110 before identifying a location on the screen 100A where the UI element 120 should be displayed. For example, upon detecting that the writing instrument 130 is tilting to the right, the UI element 120 may be displayed to the left of the writing instrument 130 to ensure the UI element 120 is not obscured by the user's hand. That is because when the writing instrument 130 is tilted to the right, the user is most likely a right-handed user and as such their hand is likely to be positioned to the right of the writing instrument 130. Positioning the UI element 120 to the left of the location of point of contact 140 ensures that the UI element 120 is in proximity to the location of input while decreasing that chances of the UI element 120 being obscured by the user's hand. This helps the user access a desired application feature quickly and efficiently without needing to move their writing instrument to a different location, while displaying the desired features in a location that is not in the user's way. This results in increased usability, user efficiency and user satisfaction.

Figure 1B:
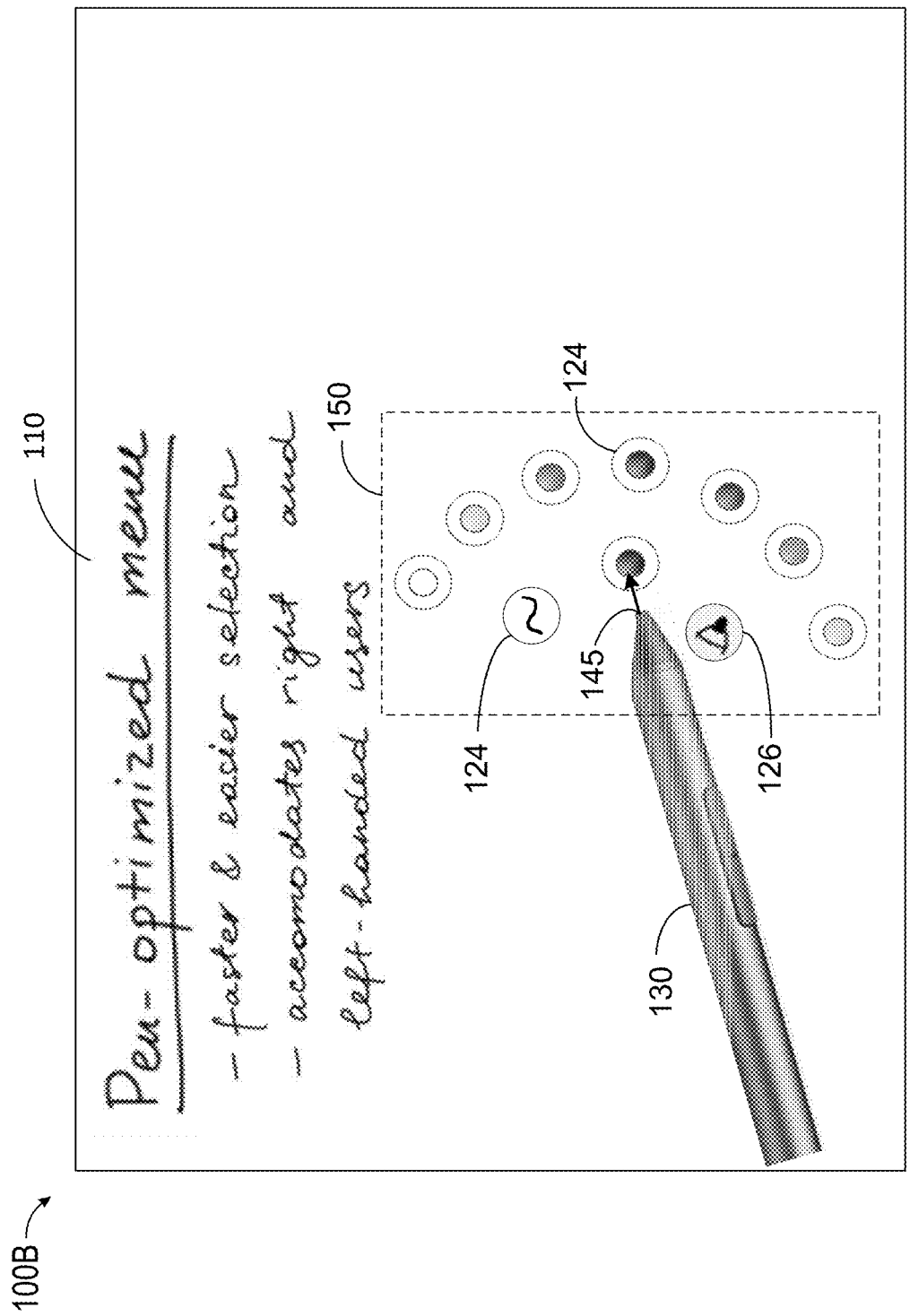

FIG. 1B depicts an example UI screen 100B for receiving digital ink input. The screen 100B is similar to the screen 100A of FIG. 1A in that it is an ink canvas receiving ink content 110 via the writing instrument 130. However, the tilt direction of the writing instrument 130 in screen 100B is different from the tilt direction of the writing instrument 130 in screen 100A. In screen 100B, the writing instrument 130 is tilted to left at the point of input 145. As a result, when the specific type of input for invoking the desired UI element (e.g., press and hold) is received, the UI element 150 is displayed to right of the writing instrument 130. The UI element 120 may include the same UI controls as the UI control 120 of FIG. 1A, but the location of the UI controls may be different to ensure proper position and orientation with respect to each other and with respect to the location of input 145 and direction of tilt. As a result, a left-handed user or any other user tilting the writing instrument 130 to the left would be able to view the UI element 150 unobstructed.

Figure 1C:
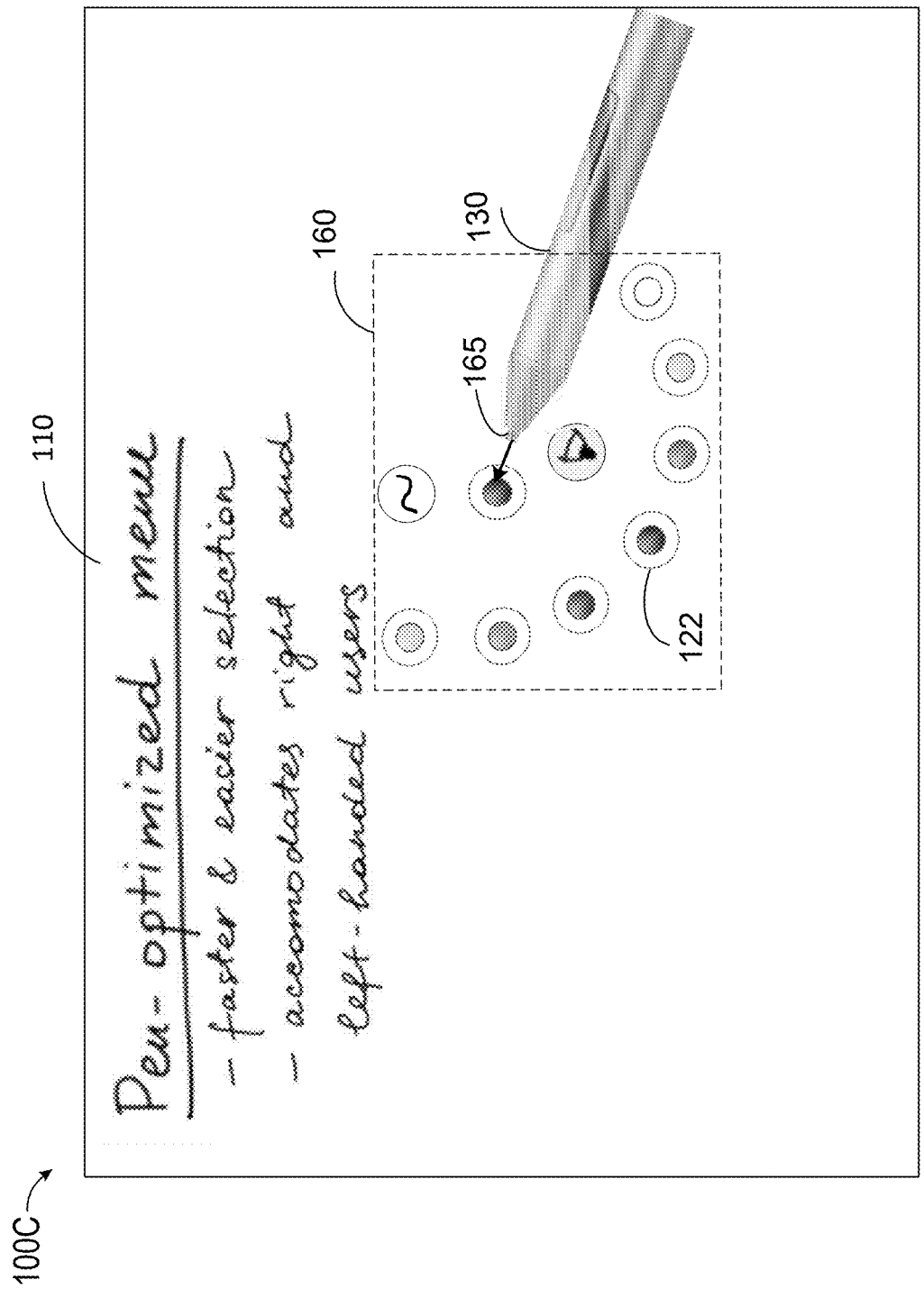

In some implementations, not only is the location of the user's hand taken into account but also the location of content of interest. This is depicted in UI screen 100C of FIG. 1C where the point of input 165 is in proximity to the content 110. Because the tilt direction of the writing instrument 130 is to the right, the UI element 160 may be displayed left of the writing instrument 130. However, because of the proximity of the point of input 165 to the content 110, care must be taken to ensure that the displayed UI element 160 does not obscure the content 110. As a result, the position of the UI element 160 is selected such that it does not interfere with the content 110. This not only ensures that the UI element 160 is positioned in proximity to the point of input 165 and is not obscured by the user's hand, but also that the UI element 160 does not cover a content that may be interest to the user.

Figure 1D:
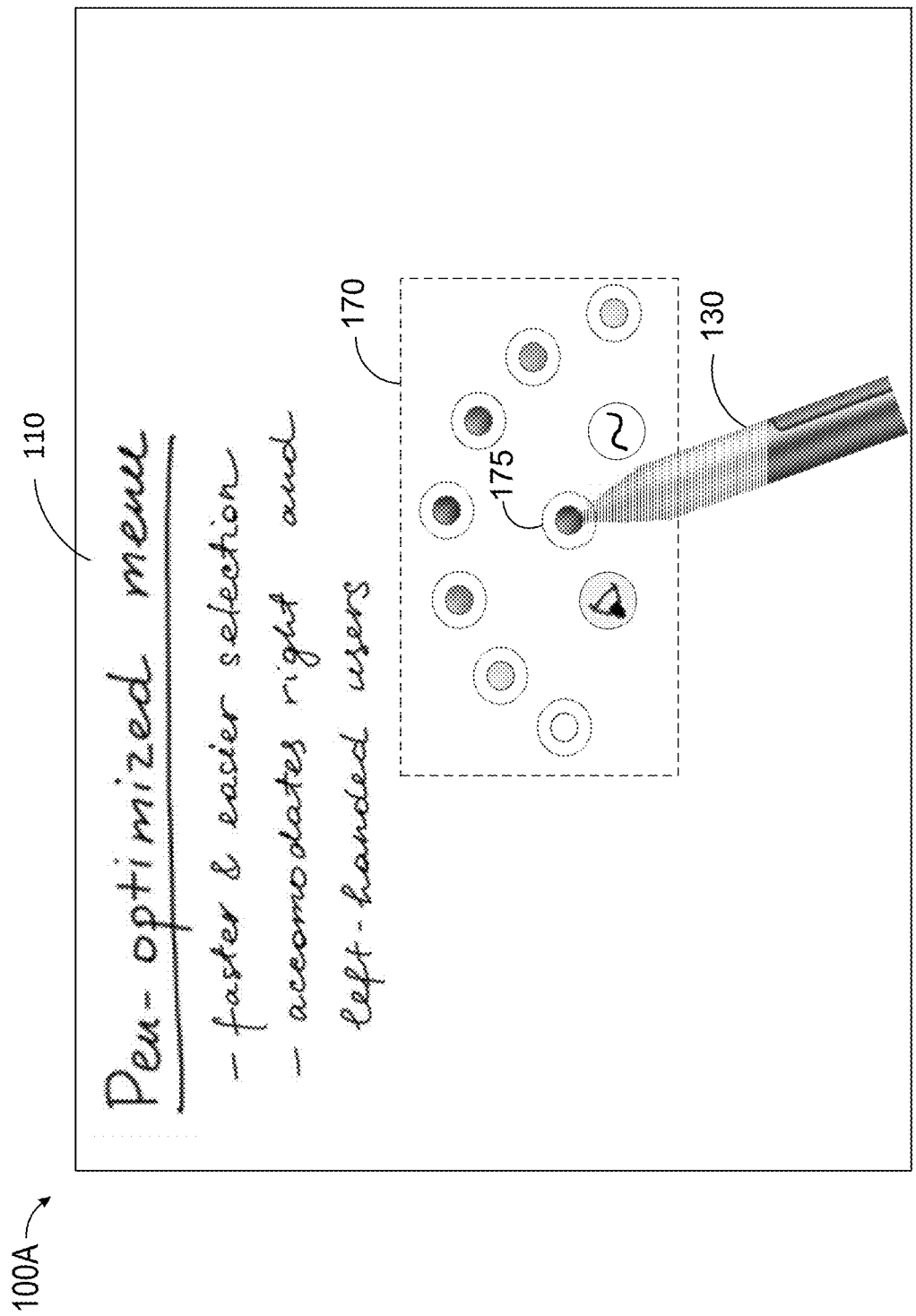

FIG. 1D depicts an example UI screen 100D for receiving digital ink input. The screen 100D is similar to the screen 100A of FIG. 1A in that it is an ink canvas receiving ink content 110 via the writing instrument 130 and the writing instrument is tilting towards the right side of the screen. However, in addition to tilting to the right side, the writing instrument 130 of FIG. 1D is also pointed to the bottom of the screen. As a result, to ensure that the UI element is visible in its entirety, the UI element 170 is displayed above the point of input 175 in the UI screen 100D. Thus, in addition to taking into account the right and left directions of the writing instrument, the top and bottom directions may also be taken into consideration. This may be achieved by computing a tilt angle for the writing instrument with respect to the screen and estimating the location of the writing instrument and thus the location of the user's hand based on the tilt angle. The UI element 170 may then be displayed in a location that is in the opposite direction of the user's hand.

Figure 2:
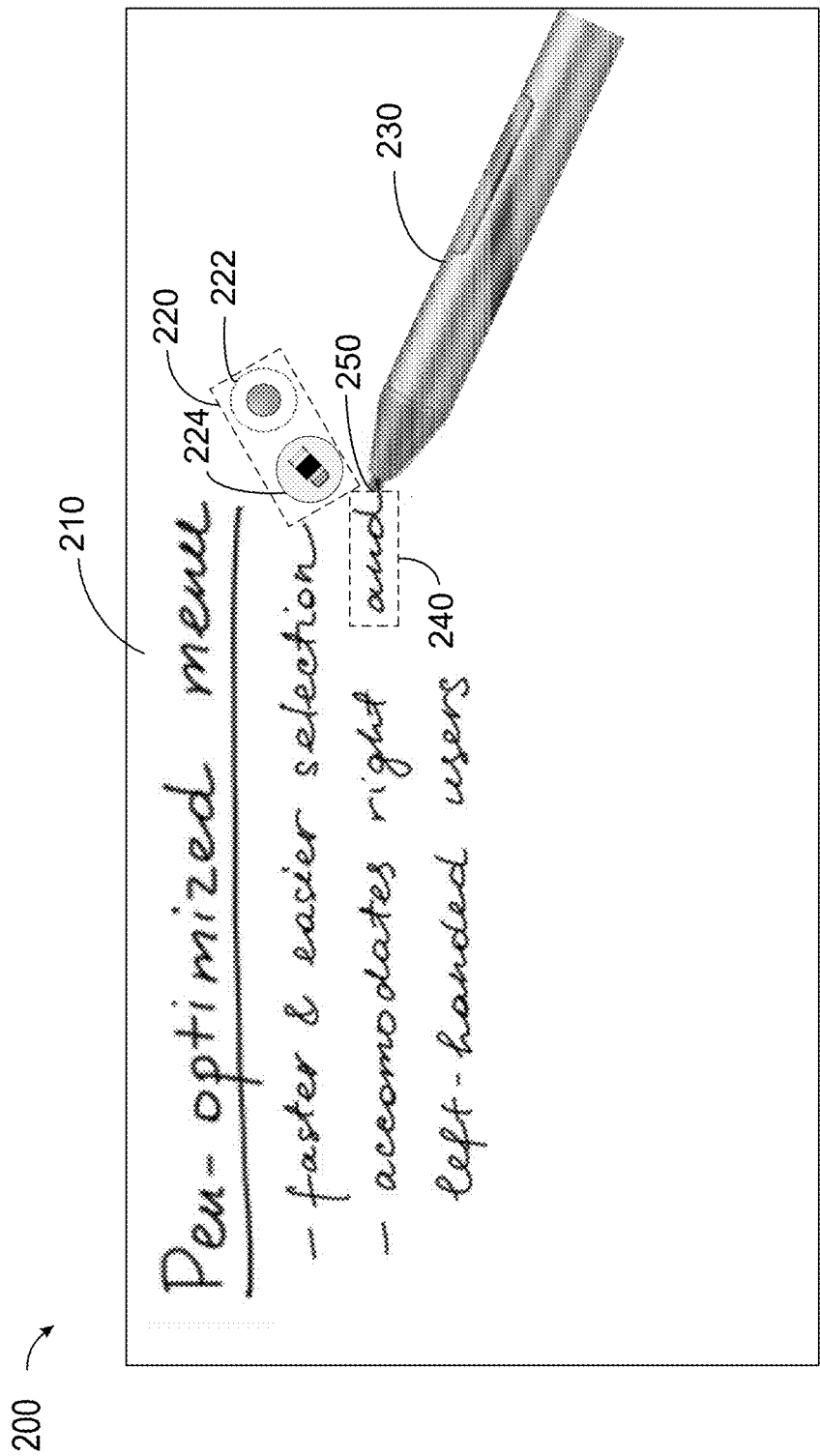
FIG. 2 depicts an example UI screen for customizing the options provided by a UI element based on the location of the digital ink input.

FIG. 2 depicts an example UI screen 200 for customizing the options provided by a UI element based on the location of the digital ink input. In some implementations, the UI controls provided by the displayed UI element may be selected based on the location of the point of input. For example, upon receiving an indication that a UI element is being invoked (e.g., receiving a press and hold input of the writing instrument), a determination may be made to detect whether the point of input is located on a previously provided input. Upon making such a determination, a customized UI element may be displayed. Thus, when the point of input 250 is located on the content 210, a determination may be made that the user intended to select a portion of the content for editing.

In some implementations, when the point of input 250 is on a specific word, the word is first identified. This may involve use of an ink conversion/recognition algorithm to convert the ink content to text before the structure of the content can be identified. For example, the written ink content may be converted to text to identify the words and characters of the ink content. Alternatively, an algorithm that recognizes words based on characteristics of the ink input may be utilized. In an example, such an algorithm may take into account spacing between words to detect which portions of the ink content correspond to individual words. In addition to words, characters, shapes and other drawings may also be identified.

In some implementations, a content segment (e.g., multiple words) may be detected as being selected. This may occur, for example, upon receiving specific types of input. For example, pressing and dragging the writing instrument over a portion of content may indicate that the portion upon which the writing instrument was dragged is being selected. Once the portion is identified, specific words and/or drawings within the portion may be detected and designated as being part of the selected segment.

Once a portion of the content is determined as being selected, the selected portion may be visually identified. For example, when the writing instrument 230 of FIG. 2 is used such that the point of input 250 falls on the portion 240 of content 210, the portion 240 may be identified by displaying dotted lines around it. In another example, the selected portion may be highlighted and/or displayed in a different color than the background color of the UI screen 200. This may enable the user to visually identify the portion of the content 210 being selected so that they can correct the selection if it is not in line with their choice.

Depending on the type of content selected, the UI element displayed may be customized to present features related to the selected content. Displaying a customized UI element can provide quick access to features that are most likely to be needed, while keeping the display screen from being overcrowded and/or obscuring content. Thus, when the selected content is determined to be a word such as the content 240, a UI element 220 may be displayed that provides a few UI controls for editing the selected content 240. As a result, the ink enabled UI element may be contextually related to the content.

The UI element 220 may include a UI control 222 for changing the color of the ink in the selected content 240. In some implementations, selecting the UI control 222 may result in the display of additional UI controls that present other colors to choose from. In this manner, while the UI element 220 remains small in size, it may provide access to further features, when needed. The UI element 220 may also include a UI control 224 for providing an eraser. Other types of UI controls may be displayed. For example, some UI elements may include 3 or more UI controls. Furthermore, the types of UI controls displayed may depend on the type of content selected. For example, different UI controls may be displayed for text and drawings. Thus, in some implementations, the ink-enabled UI element is contextual and provides different menu options depending on the location of input and/or other parameters. For example, when the location of input falls on an empty space, a UI element displaying a range of menu options that may be of interest to the user may be provided. The menu options may be determined based on the types of content on the screen (e.g., characters, shapes, mathematical formulas, etc.), a history of the user's use of menu options, the current selections (e.g., current pen, color, stroke and the like) and other parameters. Furthermore, when the location of input falls at or near content on the screen, the UI element may display contextual menu options that relate to the content. For example, if the location of input falls on content that includes a mathematical formula, an option for converting the ink to a mathematical formula may be presented. Thus, the UI element may display options that are customized to the current context.

It should be noted that even when the UI element is customized for a selected content segment, the UI element may be displayed in a location that is least likely to interfere with the content and/or the location of the user's hand. For example, because the writing instrument 230 is directed downwards, and the upper right portion of the screen 200 is clear, the UI element 220 is displayed in an upper right location that is proximate to both the point of input 250 and the portion 240.

Figure 3:
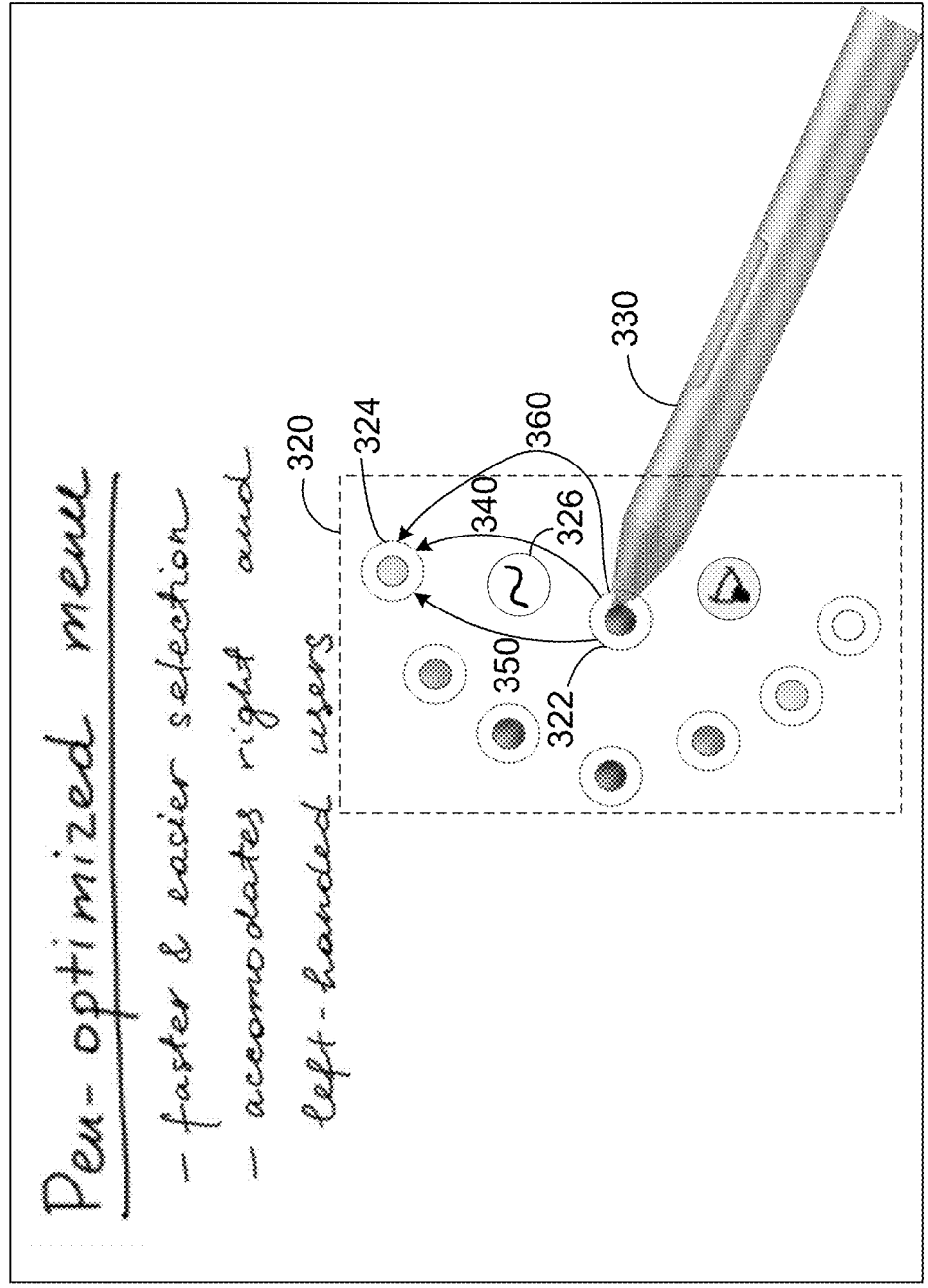
FIG. 3 depicts an example UI screen for providing multiple paths for navigating a UI element using digital ink input.

FIG. 3 depicts an example UI screen 300 for providing a digital ink enabled UI element that facilitates accessing UI controls offered by the UI element via multiple paths. Traditional radial UI elements (e.g., radial menus) often require precise selection. As a result, to navigate such menus with a writing instrument, the user would have to take specific paths from one UI control to another to reach a desired feature. This often leads to user frustration and inefficiency. The UI element 320 of UI screen 300 addresses this problem by enabling the user to access the different UI controls via a plurality of paths.

When the writing instrument 330 is used to select the UI control 322, the outer color selection UI controls are displayed. At this point, the user can use the writing instrument 330 freely to navigate from the UI control 322 to the UI control 324. This can be achieved by moving the writing instrument 330 on the screen 300 to choose a desired path from one point to another. For example, the user can take any of the paths 340, 350 and 360 to navigate from the UI control 322 to the UI control 324. In this manner, the user can choose any gaps between displayed UI controls to travel from a current UI control to a desired UI control. Thus, the UI element 320 enables navigation via unstructured paths. This provides flexibility and can significantly improve user satisfaction.

Figure 4:
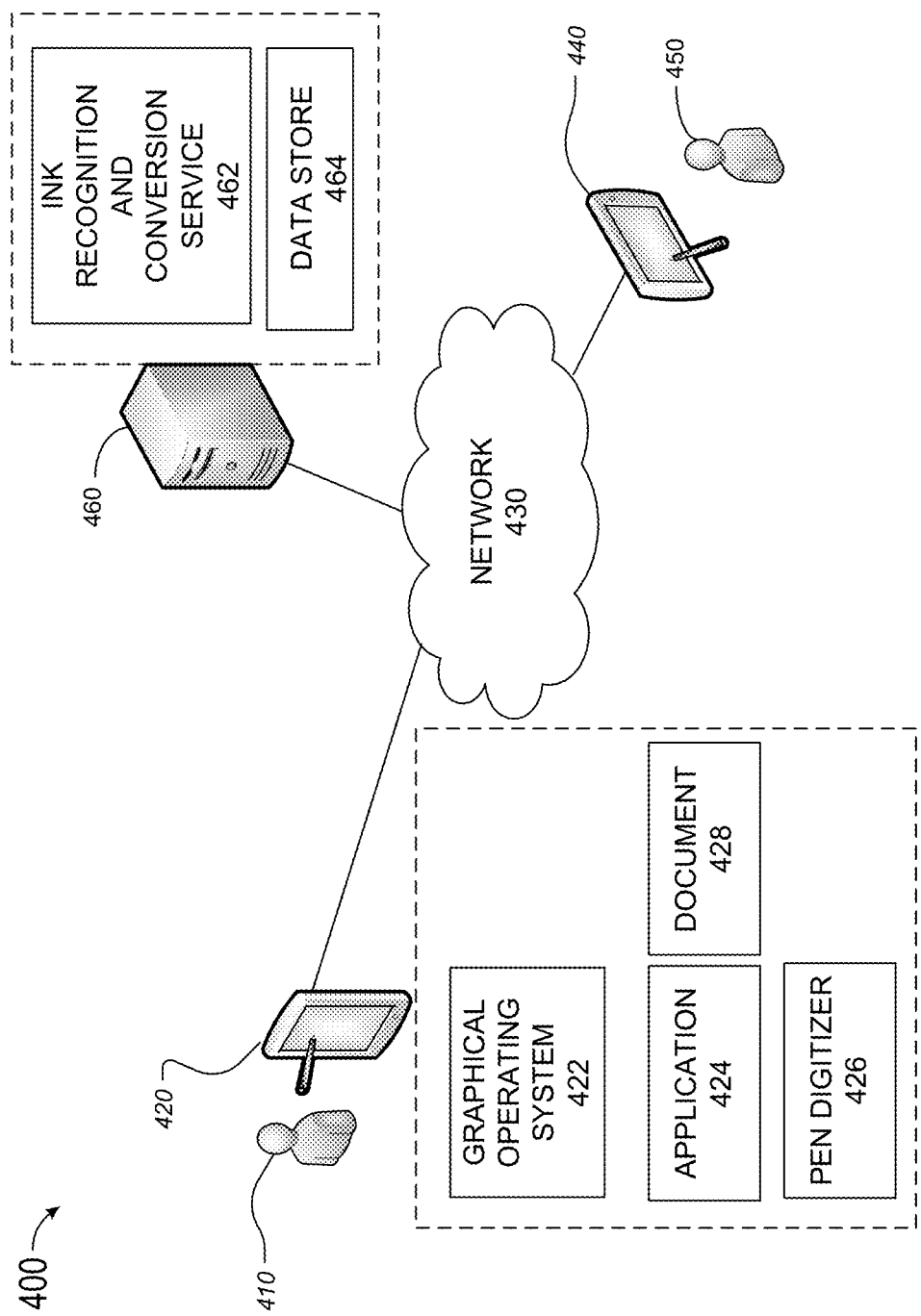
FIG. 4 depicts an example of a representative environment for providing digital ink optimized UI elements.

FIG. 4 illustrates an example system environment 400, upon which aspects of this disclosure may be implemented. In different implementations, the environment can include a plurality of computing device users, also referred to herein as users. For example, a first user 410 and a second user 450 are depicted in FIG. 4, using respective client devices 420 and 440. Each user can interact with or utilize a digital ink enabled application such as application 424 via their respective client devices. Each application 424 may be a computer program executed on the client device 420 that configures the device to be responsive to user input to allow the user 410 to interactively view, generate and/or edit digital content such as digital ink content within the electronic document 428. The electronic document 428 can be any document that can receive and/or store digital ink data. The electronic document 428 and the term "document" used herein can be representative of any file that can be created via an application executing on a computer device. Examples of documents include, but are not limited to, word-processing documents, presentations, spreadsheets, notebooks, email messages, and the like. The electronic document 428 may be stored locally on the client device 420, stored in the data store 464 or stored in a different data store and/or server.

The application 424 may process the electronic document 428, in response to user input through an input device such as a writing instrument, to create and/or modify the content of the electronic document 428, by displaying or otherwise presenting display data, such as a UI which includes the content of the electronic document 428, to the user 410. Examples of suitable applications include, but are not limited to, a word processing application, a presentation application, a note taking application, a text editing application, an email application, a spreadsheet application, an instant messaging application, a communications application, and the like.

Input from a writing instrument may be received and processed via a pen digitizer 426. In some implementations, the pen digitizer is a layer of material (e.g., glass) positioned over a display screen of the client device 410. The pen digitizer 426 may include one or more sensors designed to detect movement on the screen. Once movement is detected, the pen digitizer 426 may convert the analog touch input into digital signals. The digital signals may include position of the writing instrument and/or other properties about the touch input such as direction of stroke, timing, velocity, tilt and/or pressure. In an example, the digital signals for a given touch input may include the X and Y axis position of each touch input and the tilt of the writing instrument. As is known in the art, the tilt may be calculated by detecting the nature of electromagnetic waves generated by the writing instrument. The digital signals that are collected or calculated by the pen digitizer may be transmitted to a graphical operating system 422 (e.g., Microsoft® Windows) for further processing. The graphical operating system 422 may transmit the digital signals to the application 424, which may process the digital signals to identify a position on the UI screen of the application 424 for the digital ink input received. Depending on the identified position and/or tilt, the application 424 may display a UI element in a location that is convenient to the user. For example, as discussed above, the application 424 may display the UI element in a location that is proximate to the position of the input but is in the opposite direction of the detected tilt. Furthermore, the location of the input may determine the type of UI controls presented within a displayed UI element such that a contextual menu meeting the user's need is provided.

To provide a contextual menu, in some implementations, data relating to the entered digital ink (e.g., pen signals) may be collected by each respective device and transmitted to a server 460 via one or more network(s) 430. The server 460 may include or be connected to a data store 464 which can be used to store the collected data. The server 460 may also include and/or be connected to a digital ink recognition and conversion service 462 for converting digital ink entered in one of the devices 410 and 440. Once the digital ink recognition and conversion service 462 recognizes and/or converts the digital ink input, it may transmit the converted/identified characters to the respective user device which may use the information in determining the type of UI controls displayed in the UI element. For example, if the location of input falls on or within a given distance of a recognized word, the displayed UI element may include UI controls that relate to editing the digital ink for the recognized word. In some implementations, the client device 410 may itself include a digital ink recognition and conversion engine for performing digital ink recognition and conversion operations.

The network 430 may be a wired or wireless network or a combination of wired and wireless networks. In some implementations, the server 460 is configured to perform one or more steps of the methods disclosed herein via for example the recognition and conversion service 462. Furthermore, the server 460 may include one or more online digital ink enabled applications that may be accessed via each of the client devices 410 and 440.

The client devices 420 and 440 may include any stationary or mobile computing devices configured to provide a user interface for interaction with a user and/or configured to communicate via the network 430. For example, the client devices may include workstations, desktops, laptops, tablets, smart phones, cellular phones, personal data assistants (PDA), printers, scanners, telephone, or any other device that can be used to interact with a user.

It should be noted that although the devices 420 and 440 are shown as being connected to the network 430, they could be disconnected and operate independently from a network environment, at least temporarily. For example, a local digital ink application and processing engine may be used to receive, process and convert the digital ink and provide digital ink optimized UI elements for one or more of the devices 420 and 440.

Figure 5:
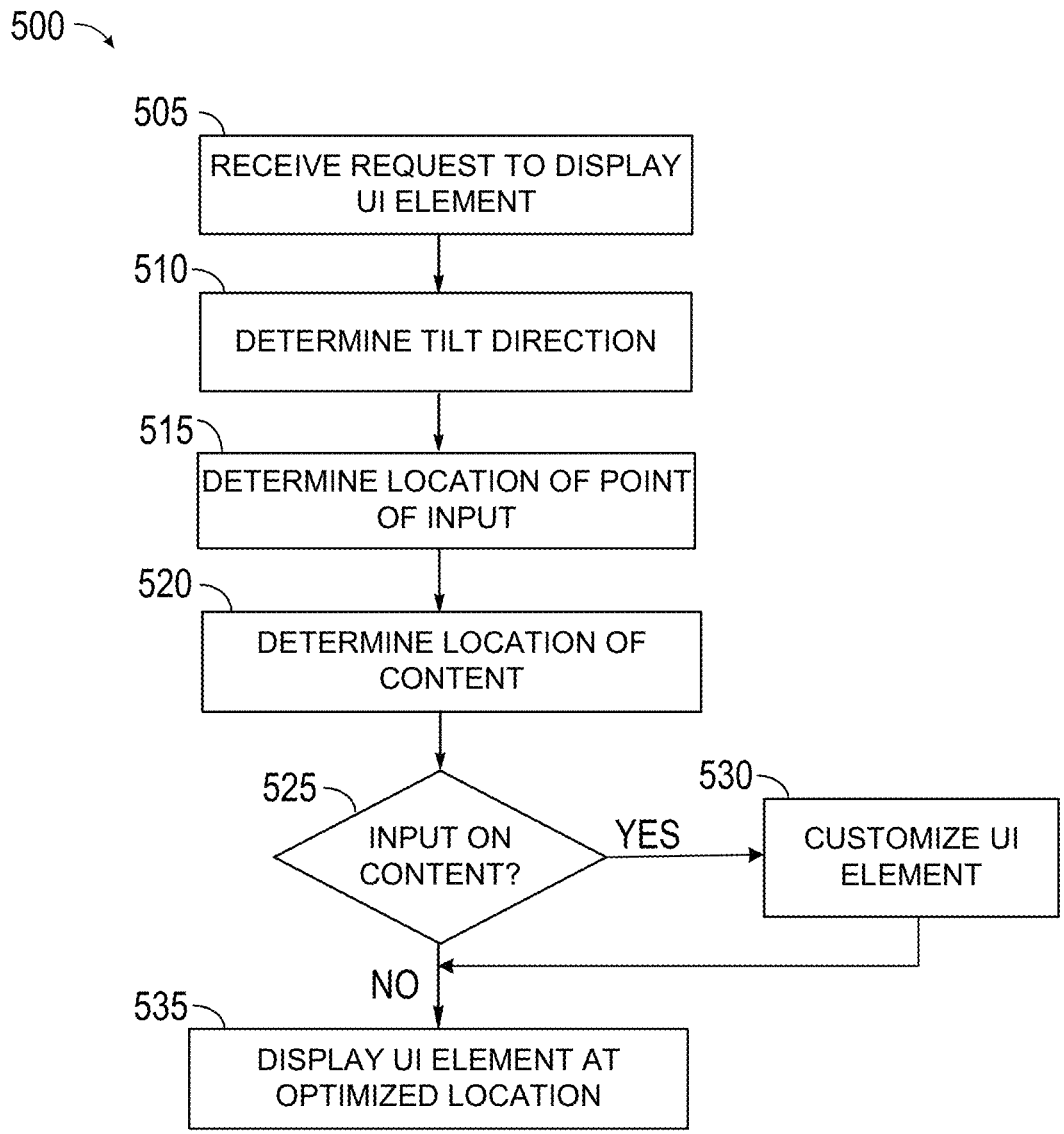
FIG. 5 is a flow diagram showing an example method for providing digital ink optimized UI elements.

FIG. 5 is a flow diagram depicting an example method 500 for providing digital ink optimized UI elements. In an example, one or more steps of method 500 may be performed by an application (e.g., application 424 of FIG. 4), pen digitizer (e.g., pen digitizer 426 of FIG. 4), graphical operating system (e.g., graphical operating system 422 of FIG. 4). Other steps of method 500 may be performed by an ink recognition and conversion service (e.g., ink recognition and conversion service 462 of FIG. 4).

At 505, the method 500 may begin by receiving a request to display a UI element. This may be done by receiving a specific type of input from a writing instrument. For example, an input involving pressing and holding of the writing instrument on a display screen of a computing device may indicate a request for display of an ink related UI element. The user may perform such an action to invoke the display of a UI element presenting ink related application features.

Once a request for invoking the UI element has been received, method 500 may proceed to determine a tilt direction for the writing instrument, at 510. The tilt direction may indicate the direction to which the writing instrument is tilting, when it provides the input invoking the UI element. In some implementations, the tilt direction includes right, left, up and down directions. In other implementations, the tilt direction also includes a tilt angle with respect to a horizontal and/or vertical axis (e.g., x and y axis) of the display screen. For example, the tilt direction may indicate that at the point of input, the writing instrument is tilting to the right at 130 degrees from the vertical axis of the display screen.

In addition to determining the tilt direction, method 500 may also determine the location of point of input, at 515. This may involve determining the coordinates for the point of input at which the request for invoking the UI element was received. In an example, this includes receiving the horizontal and vertical axis coordinates for the location at which the writing instrument was used to invoke the UI element (e.g., the location of hold and press). After determining the location of point of input, method 500 may proceed to determine the location of existing content on the display screen, at 520. This may include first determining if content exists on the UI screen. For example, the document may be examined to determine if any content has been entered on the currently displayed UI screen. Once it is determined that the UI screen includes content, the location of the content may be determined. This may involve utilizing a graphical operating system along with the application displaying the document to identify the location of content with respect to the horizontal and vertical axes of the screen.

Once the location of point of input and the existing content is determined, method 500 may proceed to determine if the location of point of input falls on or within a given proximity to the location of content, at 525. This may include determining if the point of input is close enough to any portion of existing content that it may indicate selection of a portion. In some implementations, when the point of input is determined to be close to existing content, a determination may be made to detect which portions of the existing content the selection relates to. This may involve recognition and/or conversion of ink input to identify words, characters and/or drawings. If the point of input falls on or within a given proximity to a known word, text segment, character, emoticon or shape, the identified content may be determined as being selected.

When it is determined that the point of input is located on or within a given proximity to existing content (yes at 525), method 500 may proceed to customize the UI element based on the existing content, at 525, before moving to display the customized UI element at an optimized location, at 535. This may involve displaying UI controls (e.g., menu options) that relate to the selected content. Thus, the UI element may be customized to be contextually related to the content.

When, however, it is determined that the point of input does not fall on or within a predetermined distance to existing content (e.g., point of input falls on an empty space on the UI screen), method 500 may directly proceed to step 535 to display the UI element (e.g., display a full UI element) at an optimized location. The optimized location may be a location that is in an opposite direction from the tilt direction of the writing instrument to ensure that the user's hand does not obscure the UI element. Furthermore, for documents that include existing content, the optimized location may include a location that does not obscure existing content.

Figure 6:
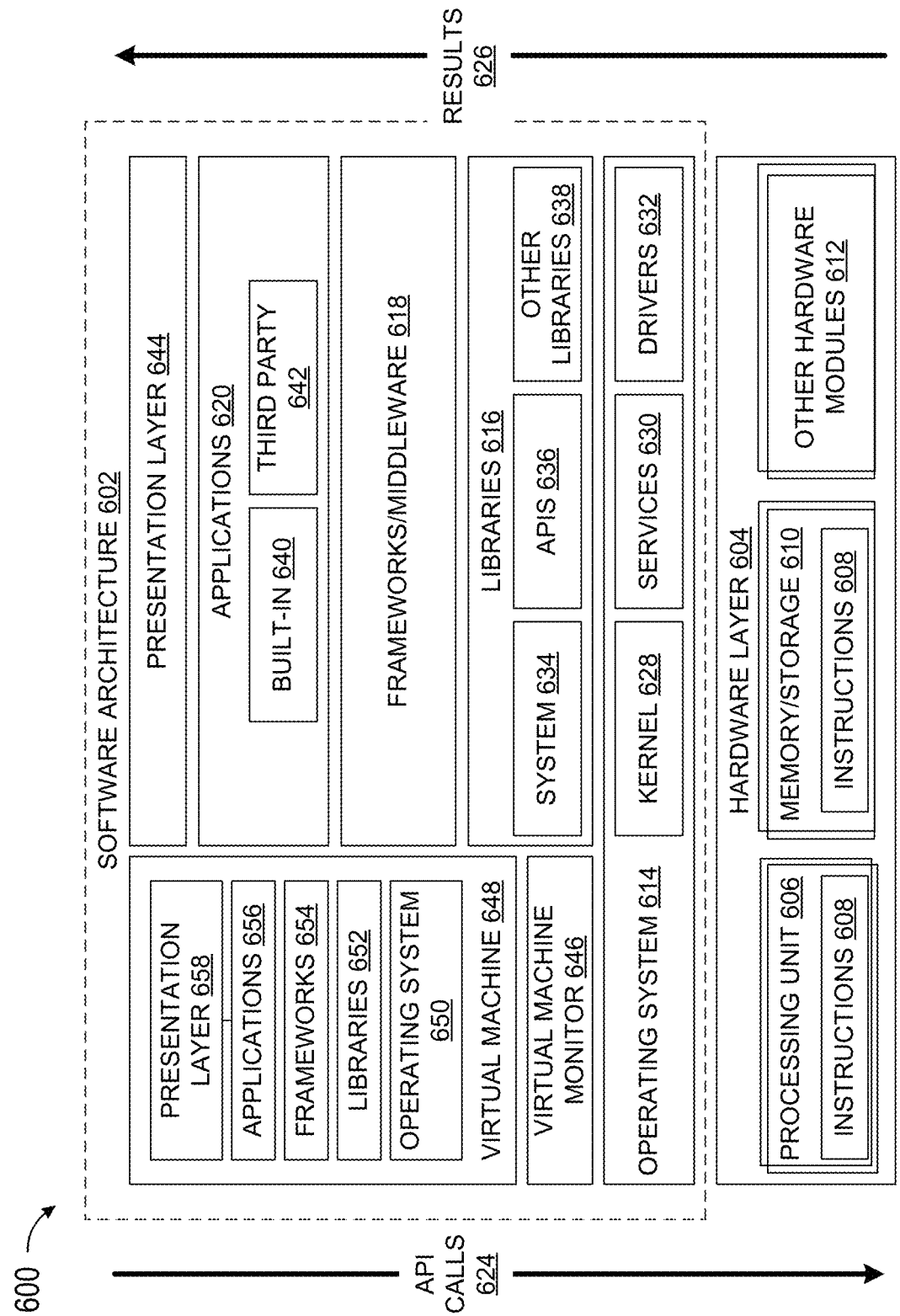
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/ modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 748 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
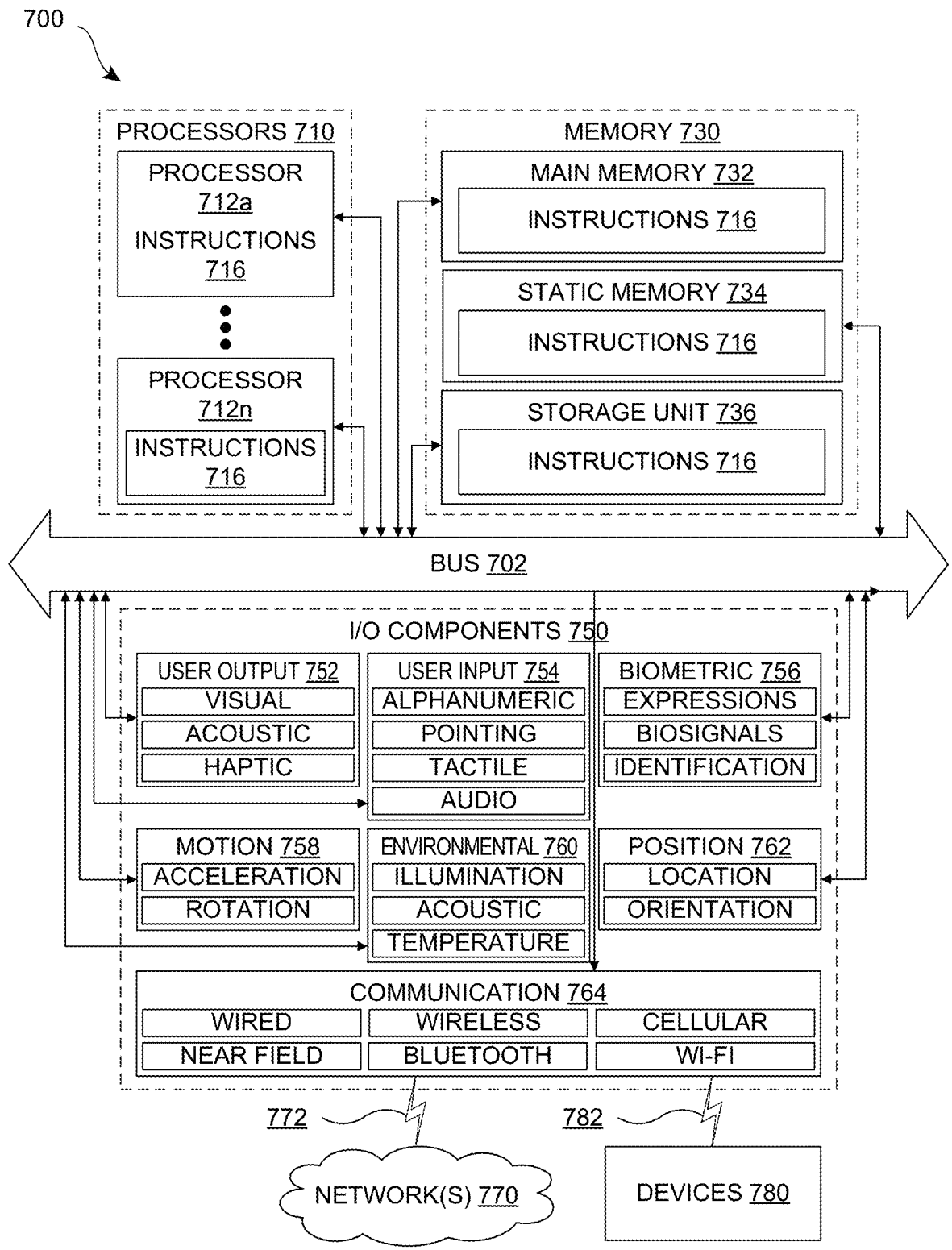
FIG. 7 is a block diagram illustrating components of an example machine configured to read instructions from a machine-readable medium and perform any of the features described herein.

FIG. 7 is a block diagram showing components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 816.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof.

Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A device comprising:
  a processor; and
  a memory in communication with the processor, the memory comprising executable instructions that, when executed by the processor, cause the device to perform functions of:
    receiving an input for invoking a user interface (UI) element in a UI screen, the input being received via a writing instrument;
    determining a direction of tilt of the writing instrument at a point of input; and
    upon determining the direction of tilt of the writing instrument, displaying the UI element in a location on the UI screen that is in a direction opposite to the determined direction of tilt of the writing instrument to minimize obstruction of the UI element by a user's hand.

Item 2. The device of item 1, wherein the executable instructions, when executed by the one or more processors, further cause the device to perform functions of:
  determining a first position on the UI screen at which the input was received;
  determining a second position on the UI screen at which existing content is located; and
  selecting the location on the UI screen to minimize obstruction of the existing content by the UI element.

Item 3. The device of any of items 1 or 2, wherein the UI element is a radial UI menu comprising a plurality of UI controls and each of the plurality of UI controls is displayed in a size such that each of the plurality of UI controls is visually recognizable as a distinct menu option.

Item 4. The device of any of the preceding items, wherein the UI element is a nested radial UI menu.

Item 5. The device of any of the preceding items, wherein the location is selected such that it is close to a position of point of input.

Item 6. The device of any of the preceding items, wherein the location is selected based on at least one of:
  a position of the point of input with respect to one or more edges of the UI screen such that the UI element fits withing available screen area, and
  screen placement of additional UI elements such that the UI element does not obscure the additional UI elements.

Item 7. The device of any of the preceding items, wherein the UI element includes a plurality of UI controls and the UI element provides access to each of the plurality of UI controls via a plurality of unstructured paths.

Item 8. A method for providing a user interface (UI) element comprising:
  receiving an input for invoking the UI element in a UI screen, the input being received via a writing instrument;
  determining a direction of tilt of the writing instrument at a point of input; and
  upon determining the direction of tilt of the writing instrument, displaying the UI element in a location on the UI screen that is in a direction opposite to the determined direction of tilt of the writing instrument to minimize obstruction of the UI element by a user's hand.

Item 9. The method of item 8, further comprising:
  determining a first position on the UI screen at which the input was received;
  determining a second position on the UI screen at which existing content is located; and
  selecting the location on the UI screen to minimize obstruction of the existing content by the UI element.

Item 10. The method of items 8 or 9, wherein the UI element is a radial UI menu comprising a plurality of UI controls and each of the plurality of UI controls is displayed in a size such that each of the plurality of UI controls is visually recognizable as a distinct menu option.

Item 11. The method of any of items 8-10, wherein the UI element is a nested radial UI menu.

Item 12. The method of any of items 8-11, wherein the location is selected such that it is close to a position of the point of input.

Item 13. The method of any of items 8-12, wherein the UI element includes a plurality of UI controls and the UI element provides access to each of the plurality of UI controls via a plurality of unstructured paths.

Item 14. A non-transitory computer readable medium on which are stored instructions that when executed cause a programmable device to:
  receive an input for invoking a user interface (UI) element in a UI screen, the input being received via a writing instrument;
  determine a direction of tilt of the writing instrument at a point of input; and
  upon determining the direction of tilt of the writing instrument, display the UI element in a location on the UI screen that is in a direction opposite to the determined direction of tilt of the writing instrument to minimize obstruction of the UI element by a user's hand.

Item 15. The non-transitory computer readable medium of item 14, wherein the instructions further cause the programmable device to:
  determine a first position on the UI screen at which the input was received;
  determine a second position on the UI screen at which existing content is located; and
  select the location on the UI screen to minimize obstruction of the existing content by the UI element.

Item 16. The non-transitory computer readable medium of items 14 or 15, wherein the UI element is a radial UI menu comprising a plurality of UI controls and each of the plurality of UI controls is displayed in a size such that each of the plurality of UI controls is visually recognizable as a distinct menu option.

Item 17. The non-transitory computer readable medium of any of items 14-16, wherein the UI element is a nested radial UI menu.

Item 18. The non-transitory computer readable medium of any of items 14-17, wherein the location is selected such that it is close to a position of the point of input.

Item 19. The non-transitory computer readable medium of any of items 14-18, wherein the location is selected based on at least one of:
- a position of the point of input with respect to one or more edges of the UI screen such that the UI element fits withing available screen area, and
- screen placement of additional UI elements such that the UI element does not obscure the additional UI elements.

Item 20. The non-transitory computer readable medium of any of items 14-19, wherein the UI element includes a plurality of UI controls and the UI element provides access to each of the plurality of UI controls via a plurality of unstructured paths.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
   a processor; and
   a memory in communication with the processor, the memory comprising executable instructions that, when executed by the processor, cause the device to perform functions of:
   receiving a first input for invoking a user interface (UI) element on a UI screen, the UI element being a radial menu displaying a plurality of UI controls;
   responsive to receiving the first input, displaying a plurality of first level UI controls of the plurality of UI controls;
   receiving a second input for selection of one of the first level UI controls;
   responsive to receiving the second input, displaying a plurality of second level UI controls of the plurality of UI controls, the plurality of second level UI controls displaying a radial submenu of the selected one of the first level UI controls, the radial submenu having a plurality of menu items and the second level UI controls being displayed concurrently as the plurality of first level UI controls and the concurrent display of the first level UI controls and the second level UI controls resulting in a plurality of gaps between each of the plurality of first level UI controls and the second level UI controls; and
   enabling a user to select any gaps formed between the selected one of the first level UI controls, another one of the first level UI controls and one of the plurality of second level controls to navigate from the selected one of the first level UI controls to the one of the plurality of second level UI controls.

2. The device of claim 1, wherein the second level UI controls are displayed in proximity to the first level UI control.

3. The device of claim 1, wherein each of the plurality of UI controls is a distinct menu option.

4. The device of claim 1, wherein the UI element is a nested radial UI menu.

5. The device of claim 1, wherein the instructions when executed by the processor, further cause the device to perform functions of:
   upon receiving the first input, calculating a tilt angle of a writing instrument used to provide the first input, the tilt angle being calculated with respect to a writing surface at a point of input;
   determining a direction of tilt of the writing instrument based on the calculated tilt angle; and upon determining the direction of tilt of the writing instrument, displaying the UI element in a location on the UI screen that is in a direction opposite to the determined direction of tilt of the writing instrument to minimize obstruction of the UI element by a user's hand.

6. A method for providing access to user interface (UI) controls in a UI element comprising:

receiving a first input for invoking the UI element on a UI screen, the UI element being a radial menu displaying a plurality of UI controls;

responsive to receiving the first input, displaying a plurality of first level UI controls of the plurality of UI controls;

receiving a second input for selection of one of the first level UI controls;

responsive to receiving the second input, displaying a plurality of second level UI controls of the plurality of UI controls, the plurality of second level UI controls displaying a radial submenu of the selected one of the first level UI controls, the radial submenu having a plurality of menu items and the second level UI controls being displayed concurrently as the plurality of first level UI controls and the concurrent display of the first level UI controls and the second level UI controls resulting in a plurality of gaps between each of the plurality of first level UI controls and the second level UI controls; and enabling a user to select any gaps formed between the selected one of the first level UI controls, another one of the first level UI controls and one of the plurality of second level controls to navigate from the selected one of the first level UI controls to the one of the plurality of second level UI controls.

7. The method of claim 6, wherein the second level UI controls are displayed in proximity to the first level UI control.

8. The method of claim 6, wherein each of the plurality of UI controls is a distinct menu option.

9. The method of claim 6, wherein the UI element is a nested radial UI menu.

10. A non-transitory computer readable medium on which are stored instructions that when executed cause a programmable device to perform functions of:

receiving a first input for invoking a user interface (UI) element on a UI screen, the UI element being a radial menu displaying a plurality of UI controls;

responsive to receiving the first input, displaying a plurality of first level UI controls of the plurality of UI controls;

receiving a second input for selection of one of the first level UI controls;

responsive to receiving the second input, displaying a plurality of second level UI controls of the plurality of UI controls, the plurality of second level UI controls displaying a radial submenu of the selected one of the first level UI controls, the radial submenu having a plurality of menu items and the second level UI controls being displayed concurrently as the plurality of first level UI controls and the concurrent display of the first level UI controls and the second level UI controls resulting in a plurality of gaps between each of the plurality of first level UI controls and the second level UI controls; and enabling a user to select any gaps formed between the selected one of the first level UI controls, another one of the first level UI controls and one of the plurality of second level controls to navigate from the selected one of the first level UI controls to the one of the plurality of second level UI controls.

11. The non-transitory computer readable medium of claim 10, wherein the second level UI controls are displayed in proximity to the first level UI control.

12. The non-transitory computer readable medium of claim 10, wherein each of the plurality of UI controls is a distinct menu option.

13. The non-transitory computer readable medium of claim 10, wherein each of the plurality of UI controls is a distinct menu option.

14. The non-transitory computer readable medium of claim 10, wherein the UI element is a nested radial UI menu.

* * * * *